Aug. 19, 1930.                J. S. WOODS                     1,773,212
          DEVICE FOR EXTRACTING MINERALS FROM ORE OR MINERAL BEARING SAND
                              Filed June 15, 1927
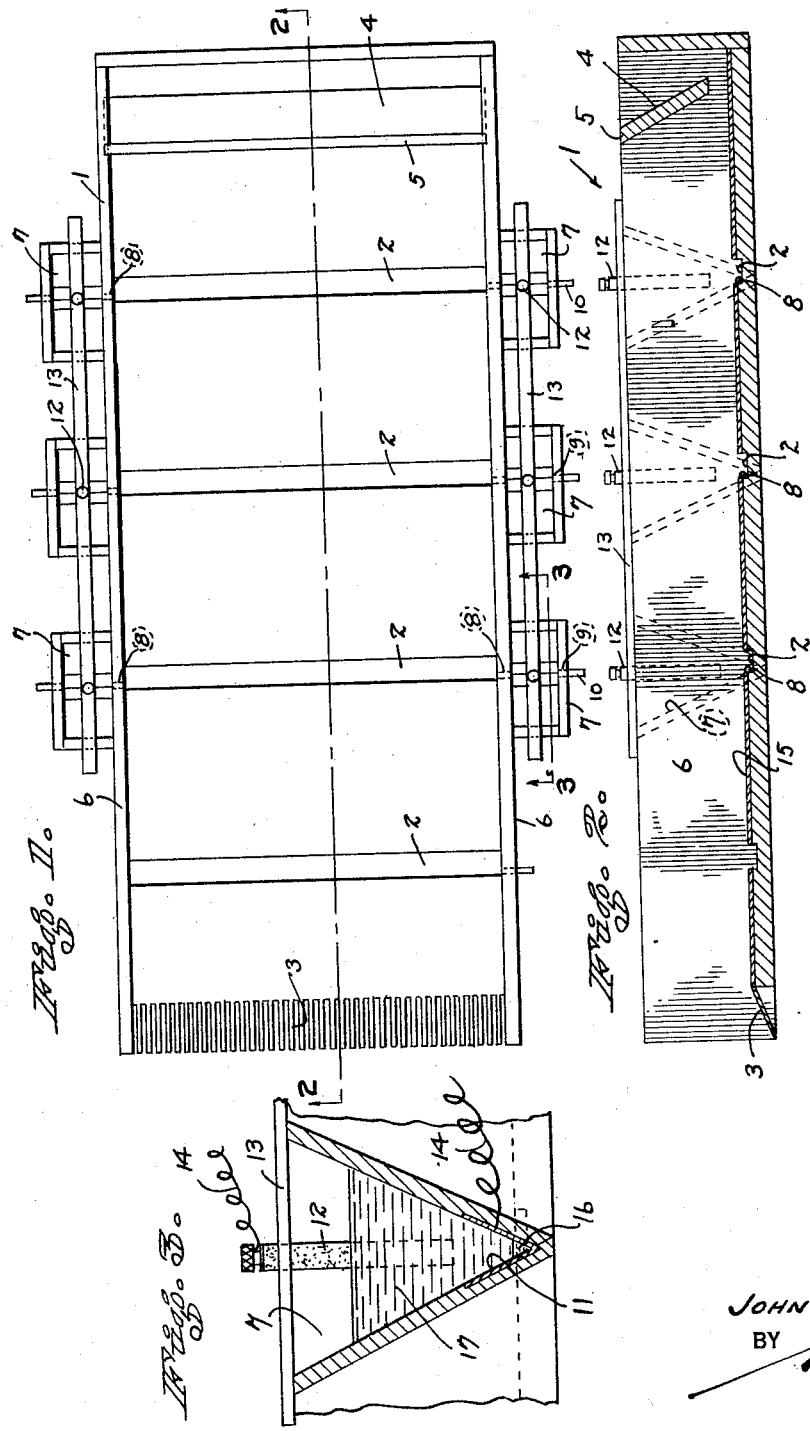
INVENTOR
JOHN S. WOODS
BY
ATTORNEYS.

Patented Aug. 19, 1930

1,773,212

UNITED STATES PATENT OFFICE

JOHN S. WOODS, OF ORLEANS, CALIFORNIA

DEVICE FOR EXTRACTING MINERALS FROM ORE OR MINERAL-BEARING SAND

Application filed June 15, 1927. Serial No. 198,983.

My invention relates to improvements in a device for extracting minerals from ore, and the like, and it consists in the combination, constructions, and arrangements hereinafter set forth and claimed.

An object of my invention is to provide a device for extracting minerals which has means for forming a sodium amalgam, that may be applied to copper plates for amalgamating ore flowing over the copper plates, thus causing the ore to be precipitated at places where it may be readily removed.

Other objects and advantages will appear in the following specification, and the novel features of my invention will be particularly pointed out in the appended claim.

My invention is illustrated in the accompanying drawing forming a part of this application, in which Figure 1 is a top plan view of the device employed with my process;

Figure 2 is a section along the line 2—2 of Figure 1; and

Figure 3 is a section along the line 3—3 of Figure 1.

In carrying out my process I make use of a pan 1 having riffles 2 therein and a grizzly 3 disposed at the open end of the pan. A trough 4 is positioned at the opposite end of the pan 1 and a partition 5 forming a wall of the trough terminates above the floor of the pan for permitting crushed ore and mineral bearing sand to pass from the trough on over the floor of the pan 1.

The side walls 6 of the pan carry V-shaped compartments 7 and each of these compartments is in connection with a riffle 2 by openings 8. Openings 9 are formed in the outer walls of the compartments 7 and are normally closed by plugs 10.

Figure 3 shows an enlarged detail view of one of the compartments 7 and it will be noted from this showing that the bottom of the compartment is lined with copper plates 11. A carbon terminal pole 12 extends into the troughs 7 and is spaced from the plates 11 as shown. This pole is supported by a cross piece 13 which extends over all of the troughs on one side of the pan 1, and provides supporting means for the carbon poles. Electric wires 14 connect the plates 11 and the poles 12 with a source of current. The bottom of the pan is lined with copper plates 15 which plates extend between the riffles 2 as clearly shown in Figure 2.

From the foregoing description of the various parts of the device, the operation thereof will be readily understood.

The riffles 2 are filled with quicksilver to a depth that will cause the quicksilver to flow through the openings 8 and into the troughs 7, thus sealing the openings 8. I have shown the quicksilver in Figure 3 by the reference numeral 16. The compartments, or charging vats 7 are then filled with water 17 to approximately the depth shown in Figure 3 and it will be noted that the quicksilver prevents the water from flowing onto the floor of the pan 1. Sodium chloride is now added to the water and then a D. C. current is caused to flow between the poles 12 and the plates 11. The current passes from the carbon poles and deposits the sodium on the quicksilver, making a sodium amalgam. The chlorine passes to the poles 12 and escapes as a gas.

The sodium amalgam is now painted upon the copper plates 15 in any manner desired and then the pulp is poured into the trough 4 and is allowed to flow over the bottom of the pan 1. The metals carried by the pulp are amalgamated and deposited in the quicksilver carried by the riffle 2. These metals may be drawn off by removing the plugs 10 and allowing the quicksilver to flow out through the openings 8 and 9. The grizzly 3 is a safety factor and is designed to drop any metals flowing past the last riffle into a bin, not shown, disposed beneath the pan for that purpose. The pan or table 1 will work as efficiently for black sands as it will with crushed ore.

I claim:

In a mineral extracting machine, a sluice box having riffles therein, the side walls of said box having openings communicating with the riffles, vats adapted to contain brine and being carried by each side wall, there being as many vats as there are openings, said riffles being adapted to retain mercury to a depth to submerge the openings between the vats and riffles, and electrodes disposed in each vat to be immersed in the brine.

JOHN S. WOODS.